Patented Apr. 15, 1952

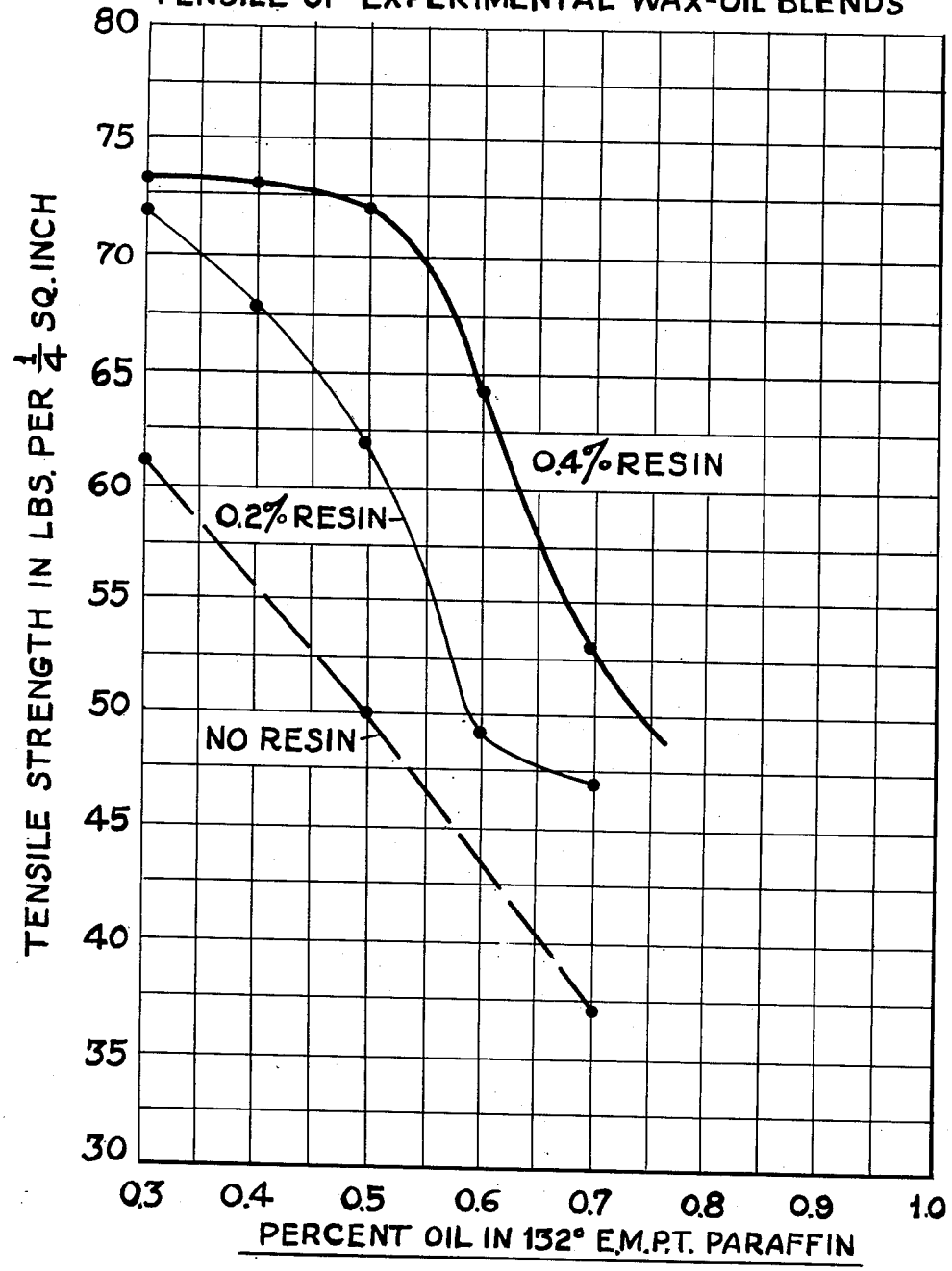

UNITED STATES PATENT OFFICE 2,593,381

STABILIZED PARAFFIN WAX COMPOSITIONS

David W. Young, Roselle, N. J., assignor to Standard Oil Development Company, a corporation of Delaware Application November 30, 1948, Serial No. 62,775

1 Claim. (Cl. 260—28.5)

The present invention relates to stabilized paraffin wax compositions and to methods of preparing them. More specifically, the invention relates to improved compositions comprising a major quantity of paraffin wax having improved qualities of light stability, tensile strength, and the like, imparted by the addition of a minor quantity of a synthetic resin of the alkylene benzene-olefinic copolymer type.

In the U. S. patent to Smyers, No. 2,274,749, there is disclosed broadly a process for copolymerizing an alkylene benzene, such as styrene, for example, with an aliphatic olefin, such as isobutylene. The copolymerization is conducted at low temperatures in the presence of a suitable Friedel-Crafts catalyst, such as aluminum chloride, boron fluoride, or the like. The patent also contains a suggestion that resins of this general type may be blended with oils, waxes, and the like. The present invention is a specific improvement based upon certain newly discovered and unexpected properties which may be imparted to paraffin base waxes which, by reason of excessive oil content, would ordinarily be of relatively little value.

Paraffin waxes are widely used for many purposes, one of the most important of which is the coating of paper, cardboard, and the like, for the packaging and preservation of numerous kinds of perishable products, particularly foods, and the like. The paraffin wax compositions used for these purposes must meet certain high standards of purity, light stability, tensile strength, imperviousness to moisture, and the like. Where paper, cardboard, or other sheet material is first coated with wax compositions and later is rolled or stacked, the composition of the wax should be such as to resist "blocking," that is, the adhesion of separate coated sheets or layers under pressure. These waxes have a melting point which usually lies between about 115° and 155° F., limits of about 120° to 150° F. usually being preferred.

In order to meet the foregoing requirements, it has been considered necessary in the prior art that paraffin waxes of petroleum derivation be quite fully de-oiled. To accomplish the de-oiling, it has been necessary to practice an operation known as "sweating," wherein the wax is held for a substantial period of time at a temperature very near but slightly below its melting point. Such "sweating" permits the oil which is trapped in the wax to separate if the sweating process is continued for a sufficient period of time. It is usually considered necessary that the oil content of paraffin waxes of the grade used, for example, on packaging material for foodstuffs, be limited to an over-all content of not more than about 0.3% by weight. Preferably, the oil content is somewhat lower, 0.2% being about a standard limitation although slightly more oil may be tolerated in some cases.

The removal of the last traces of oil from paraffin is a slow and therefore expensive process in the production of wax coating compositions and the like. The oil content of a paraffin base wax may be brought down to a range of about 0.4 to 0.65 or 0.75% by weight, based on the total composition, without great difficulty. Further reduction of the oil content, to as low as 0.2% for example, results in considerable increase in cost, the removal of the last 0.2 or 0.3% by the sweating process proceeding very slowly. This invention is particularly applicable to waxes which have a final oil content between about 0.25 and 0.75%, and especially those which contain 0.3 to 0.65% oil.

One feature of the present invention resides in the discovery that by the addition of a small amount of a copolymer of the general type referred to above, a higher oil content may be tolerated in paraffin wax compositions without sacrificing the qualities required as set forth above and, in fact, with resultant improvement in the composition. By incorporating a small quantity of an alkylene benzene-olefin copolymer, for example, a copolymer of styrene and isobutylene containing 40 to 70% by weight of the aromatic constituent and 60 to 30% of the olefin, the light stability, resistance to blocking, tensile strength, and resistance to penetration of moisture vapor are better in a paraffin wax containing as much as 0.3 to 0.65% by weight of sweater oil than untreated paraffin waxes of the prior art containing a much smaller quantity of sweater oil.

It will be apparent from the foregoing that one object of the present invention is to improve paraffin wax compositions in their light stability characteristics, tensile strength, resistance to blocking, and impermeability to moisture, while at the same time effecting economies in their manufacture. By this invention, an improved product is made available at a reduced cost of manufacture even when the unit cost of the added copolymer is considerably higher than the unit cost of the paraffin. The economies effected in production more than offset the added costs of the polymer which is incorporated in the wax composition.

In general, the quantities of polymer to be added are preferably between 0.1 and 1% but may be as much as 2.5% or even 5% by weight, based on the total composition. A preferred specific range for wax compositions used for coating wrapping paper, cartons, and the like, includes 0.2 to 0.4% of a copolymer which has an aromatic content of 50 to 60% by weight. Specifically, a resin produced by copolymerizing styrene and isobutylene by the low temperature process using 50 to 60% by weight of styrene and 40 to 50% of isobutylene is preferred for waxes which contain about 0.3 or 0.4 to 0.65% by weight of sweater oil. In general, the oil content should not be higher than about 0.65% because the rigid specifications required for wax coating compounds and the like, cannot be met even when the copolymer is used, if the wax has such a high oil content. In some cases, oil content as high as 0.75% may be tolerated but the lower limit of 0.65% is usually applicable.

The particular copolymer used may be varied somewhat. In general, it should have a molecular weight within the range of 2,000 to 40,000 as determined by the Staudinger method. While styrene and isobutylene are specifically preferred as the ingredients of the copolymer, other related compositions may be employed. The alkylene benzenes having from 2 to 4 carbon atoms in the alkylene group and having at least one unsaturated bond in such group may be used and the olefin may be any straight or branched chain monoolefin of 3 to 8 carbon atoms. Thus, propylene, butylene, amylene, hexylene, heptylene, and octene or diisobutylene are all useful in the copolymerization process.

The methods by which the copolymers which are used in this invention are produced form no part of the present invention, being well-known in the prior art. The preferred copolymers, specifically those having a styrene content of 50 to 60% by weight, are odorless, tasteless, granular solids in form, and are especially stable to sunlight and ultra violet light. The physical properties of two samples of such copolymer, commonly designated as "S-Polymer," are indicated in the following table:

TABLE I

|  | S-50 | S-60 |
|---|---|---|
| Specific Gravity | 0.96 | 0.93 |
| Heat Softening Point, ° C. | 45 | 60 |
| Tensile Strength, p. s. i. | 2000 | 3000 |
| Ultimate Elongation, per cent | 400 | 200 |
| Hardness, Shore A | 50-60 | 80-90 |
| Hardness, Rockwell |  | M-10 |
| Intrinsic Viscosity [1] | 0.7 to 1.8 | 0.7 to 0.9 |

[1] Intrinsic viscosity is determined by the Flory method, as is well-known in the art.

In preparing blends of paraffin wax and "S-Polymer," the resinous polymers can be added directly to the wax in the desired concentration or they may be blended with a smaller quantity of wax to form a concentrated wax-resin composition which may be added subsequently to the base wax. For example, blends of the polymer and wax containing equal parts of each may be prepared in kneaders and subsequently dispersed readily in melted paraffin wax.

Alternatively, high speed agitating equipment may be used to disperse the polymer in the wax either for the preparation of concentrates or for preparing compounds as they are to be sold and used. Unless such dispersing equipment is especially efficient the wax-polymer mixture should be heated to a rather high temperature, for example, 140° C. where it is desired to disperse large quantities, such as 20 to 50% by weight of the polymer in the wax. However, the addition of smaller amounts of polymer, for example, 0.1 to 5% of the total composition, may be accomplished with mild agitation at temperatures as low as 70 to 75° C. Quantities of the latter order are adequate for purposes of the present invention except where it is desired to make concentrated wax solutions of the polymer, as for subsequent addition to untreated wax.

*Example I*

Standard paraffin waxes were used as basic materials to which varying quantities of "S-Polymers," as described above, having either 50 or 60% styrene content, were added. The specifications of the various waxes are indicated in the following:

| Wax Sample No. | A | B | C |
|---|---|---|---|
| Grade, ASTM M. P. ° F | 130/132 | 140/142 | 146/148 |
| Oil Content, Per Cent Max | 0.32 | 0.2 | 0.2 |
| National Formulary Acid Test Max | 5 | 5 | 5 |
| Saybolt Color, Min | 30 | 30 | 30 |

The respective polymer resins were solvated in various proportions, as described below, in the above waxes at 75° C. with mechanical agitation. The time required to obtain a uniform dispersion varied from 30 minutes to 1½ hours, depending principally on the amount of polymer added. The following table gives data for the melting point, tensile strength, penetration, refractive index, viscosity, and color of the various blends of "S-50" and "S-60" resins (50% or 60% styrene content respectively).

TABLE II

[Physical properties of S-polymers in paraffin waxes]

| Per Cent S-Polymer | S-Polymer | Wax | ASTM D 127-30 Melting Point ° F. | Tensile Lbs./¼ Sq. Inch [1] | Penetration ASTM D5-25 77° F. | R. I. at 70° C. | Viscosity at 210° F Centistokes | Color Saybolt |
|---|---|---|---|---|---|---|---|---|
| 0.0 | | A | 133 | 61 | 12 | 1.4330 | 3.60 | +29 |
| 0.2 | S-50 | A | 132.5 | 70 | 11 | 1.4316 | 3.90 | Turbid. |
| 0.3 | S-50 | A | 133 | 72 | 13 | Not Det. | Not Det. | Do. |
| 0.4 | S-50 | A | 132 | 73 | 11 | 1.4318 | 4.22 | Do. |
| 2.5 | S-50 | A | 133 | 94 | 11 | 1.4351 | 8.00 | Do. |
| 5.0 | S-50 | A | 141.5 | 99 | 11 | 1.4312 | 16.12 | Do. |
| 2.5 | S-60 | A | 132.5 | 95 | 11 | 1.4340 | 6.44 | Do. |
| 5.0 | S-60 | A | 133 | 99 | 11 | 1.4356 | 11.22 | Do. |
| 0.0 | | B | 142 | 40 | 10 | 1.4353 | 4.15 | +29 |
| 0.5 | S-50 | B | 141.5 | 96 | 11 | Not Det. | 5.01 | Turbid. |
| 1.0 | S-50 | B | 141 | 97 | 11 | 1.4352 | 5.61 | Do. |
| 2.5 | S-50 | B | 142 | 99 | 11 | 1.4355 | 9.13 | Do. |
| 5.0 | S-50 | B | 141.5 | 101 | 10 | 1.4378 | 17.94 | Do. |
| 0.5 | S-60 | B | 141.5 | 104 | 10 | 1.4350 | 4.63 | Do. |
| 1.0 | S-60 | B | 142 | 104 | 11 | 1.4347 | 5.212 | Do. |
| 2.5 | S-60 | B | 141.5 | 105 | 11 | 1.4356 | 7.06 | Do. |
| 5.0 | S-60 | B | 141.5 | 113 | 10 | 1.4360 | 11.47 | Do. |
| 0.0 | | C | 146 | 55 | 10 | 1.4340 | 4.39 | +29 |
| 0.5 | S-50 | C | 146 | 92 | 9 | 1.4350 | 5.26 | Turbid. |
| 1.0 | S-50 | C | 146 | 86 | 10 | 1.4360 | 6.00 | Do. |
| 2.5 | S-50 | C | 147 | 86 | 9 | 1.4359 | 9.25 | Do. |
| 5.0 | S-50 | C | 147 | 97 | 10 | 1.4376 | 18.06 | Do. |
| 0.5 | S-60 | C | 146 | 82 | 10 | Not Det. | Not Det. | Not Det. |
| 1.0 | S-60 | C | 146 | 98 | 9 | Not Det. | Not Det. | Not Det. |
| 2.5 | S-60 | C | 146 | 110 | 10 | Not Det. | Not Det. | Not Det. |
| 5.0 | S-60 | C | 146 | 112 | 9 | Not Det. | Not Det. | Not Det. |

[1] Results obtained on a constant rate of loading machine.

The results in Table II show that tensile strength was increased appreciably by the use of the polymers in each of the three types of wax. The results show also that the S-50 polymer, which had a molecular weight of about 50,000, increased the viscosity of the wax to a greater extent than the S-60 polymer which had a lower molecular weight of 38,000. In the proportions used, neither polymer altered the melting point appreciably and the penetration characteristics remained approximately constant. The refractive index, as determined at 70° C., showed a slight increase as the amount of polymer was increased in the blends. Where the viscosity of the mixture is raised appreciably, slightly higher melting temperatures will probably be required for applying coatings to paper and the like. Although the waxes became turbid, their colors and appearances were not objectionable in any case.

The proportions of Table II appeared to be mechanically stable, no separation of polymer having been noted.

*Example II*

Higher concentrations of polymers in paraffin wax having a melting point of about 130° F. (Type A, above) were prepared as shown in Table III.

TABLE III

| Sample No. | 1 | 2 | 3 | 4 | 5 | 6 | 7 |
|---|---|---|---|---|---|---|---|
| Paraffin (M. P. 130° F.) | 100 | 95 | 90 | 80 | 95 | 90 | 80 |
| S-50 | | 5 | 10 | 20 | | | |
| S-60 | | | | | 5 | 10 | 20 |
| Viscosity in Centipoises: | | | | | | | |
| 140° F. (60° C.) | 7 | 19 | 67 | 870 | 14 | 31 | 218 |
| 160° F. (71° C.) | 6 | 16 | 55 | 683 | 12 | 25 | 170 |
| 180° F. (82° C.) | 5 | 13 | 45 | 590 | 10 | 21 | 145 |
| 200° F. (93° C.) | 4 | 11 | 37 | 518 | 8 | 18 | 125 |
| 220° F. (104° C.) | 3 | 9 | 31 | 465 | 7 | 16 | 116 |
| 240° F. (115.5° C.) | 2 | 7 | 27 | 425 | 5 | 14 | 89 |
| 260° F. (127° C.) | 2 | 5 | 23 | 393 | 4 | 13 | 72 |

Wax brickette type tensile specimens were prepared, and were pulled apart at the rate of 10 inches per min. on Scott Tester Tensile (lbs. per sq. inch) 136, 288, 330, 350, 315, 360, 405.

It will be noted in Table III that over a temperature range from 140° to 260° F. (about 60° to 127° C.), the styrene-isobutylene copolymers increased the viscosity of paraffin, the S-50 polymer of higher molecular weight increasing viscosity to a greater extent than the S-60 polymer. The tensile strength values of the resulting compositions as determined on a Scott tester show an increase in the higher concentrations as well as in the lower concentrations of Table II.

With respect to moisture vapor penetration coatings of 8 and 16 pounds (per ream) were applied to a 30 pound weight sulfite paper and tested in the General Foods moisture vapor cabinet. This test consisted of subjecting each sample to a 68 hour treatment in an atmosphere of 95% relative humidity at 100° F. The sample was cooled in a container of calcium chloride. The gain in weight before and after the test, multiplied by a constant, indicated the grams of moisture vapor which passed through each sample in 24 hours at 100° F. at 95% relative humidity. As indicated in the following table, moisture penetration was greatly improved where the copolymer was used.

TABLE IV

| Sample No. | 1 | 3 | 4 | 6 | 7 |
|---|---|---|---|---|---|
| Paraffin (M. P. 130° F.), Parts | 100 | 90 | 80 | 90 | 80 |
| S-50, Parts | | 10 | 20 | | |
| S-60, Parts | | | | 10 | 20 |
| Uncreased Specimens—Moisture penetration: | | | | | |
| 8 lb. coating on 30 lb./ream white sulfite paper [1] | 6.42 | 0.72 | 1.15 | 0.58 | 1.10 |
| 16 lbs. coating on 30 lb./ream white sulfite paper [1] | 3.04 | 0.31 | 1.34 | 0.28 | 0.49 |
| Creased Specimens, creased four ways under 13 lb. wt., then unfolded for testing 8 lb. coating on 30 lb./ream white sulfite paper | 7.63 | 1.47 | 3.22 | 1.81 | 1.35 |
| 16 lbs. coating on 30 lb./ream white sulfite paper | 4.36 | 0.92 | 2.26 | 0.98 | 0.82 |

[1] Moisture Vapor Transmission, gms./100 sq. in./24 hrs./100° F./95% relative humidity.

In still other tests it was found that polymers of the general type used in the above examples, in concentrations ranging between 0.3 and 2.5% by weight, did not change the ASTM melting point nor the penetration value at 77° F. of the wax composition. The refractive index at 70° C. increased from 1.4306 to 1.4373 with 0.5% of the S-50 resin of Examples I and II. Upon further addition of this resin the refractive index dropped to 1.4355 with 2.5% polymer. The tensile strength of the original wax in this test was 20 pounds per quarter square inch. This increased to 40 pounds when 0.5% of the S-50 resin was added and showed a still further increase as the amount of the polymer was increased.

The tendency of sheets of waxed paper to stick together, known as "blocking," became greater with increased temperatures, with increased pressures, and with the use of wax film thickeners, also with a decrease in wax melting point, or a decrease in the degree of refining. The last mentioned feature is a function of the oil content of the paraffin wax. The block point was considered as the temperature in degrees Fahrenheit at which waxed sheets of glassine paper began to adhere to each other after being under pressure of 1.5 pounds per square inch for twenty-four hours. The block points of a paraffin wax, of type A, Table II, having a melting point of about 132° F. are shown in Table V. Comparative values, using a polyethylene modifier in the wax, are also shown.

TABLE V

| Type of Additive | Wt. of Additive, Per cent | Block Point |
|---|---|---|
| | | 110° F. |
| S-60 | 0.9 | 118° F. |
| S-60 | 1.8 | 119° F. |
| S-60 | 3.0 | 120° F. |
| S-60 | 20.0 | Did not block at 120° F. |
| Polyethylene (DXL-7) | 0.9 | 119° F. |
| Polyethylene (DXL-7) | 1.8 | 120° F. |
| Polyethylene (DXL-7) | 3.0 | Did not block at 120° F. |
| Polyethylene (DXL-7) | 20.0 | Did not block at 120° F. |

The paper in each instance was coated with 6 pounds of wax per ream.

The tendency of many paraffin waxes to darken after continued exposure to light is highly objectionable, particularly in the food packaging industries. Waxes which otherwise meet specifications fully are frequently rejected because of this tendency to become discolored. The light stability of paraffin waxes appears to be materially improved by the use of small quantities of the copolymers described above, the effect being due apparently to the fact that the aromatic nucleus interferes in some way with the normal actinic activity of ultra violet and other light with the wax components. A series of tests were made by blending paraffin wax in glass equipment at about 170° F., the resulting compositions being molded subsequently to form cakes six inches square and ½ inch thick. One-half of each cake was wrapped in tin foil and the other half was left unwrapped, both being exposed to direct sunlight through the south windows of a laboratory. After a period of 14 days, the samples were observed for color changes. The wax which contained no polymer, being identical with Sample A of Table II above, yellowed considerably in the exposed portion. The same wax containing quantities from 0.4 to as much as 20% by weight of either the S-50 or S-60 resin mentioned above showed no change either in color or odor. The results of this series of experiments were checked by testing the ultra violet light transmission of 10% blends of the same compositions in iso-octane. The wax having no polymer content showed a very considerable increase in optical density after two weeks' exposure to sunlight whereas the same composition containing 0.4% by weight of the S-50 resin showed only a very slight change in optical density before and after similar exposure.

As previously indicated the use of resin polymers of the alkylene benzene-olefin type makes it possible to tolerate a considerably higher final oil content in the finished wax. In one typical refinery operation, wax is charged to sweaters with an oil content of 2.9%. Where it is necessary to sweat until the oil content is only 0.2% the percent of yield per cycle hour is only 0.608. If the oil content is increased to 0.4% the percent yield per cycle hour increases to 1.140, nearly double that of the wax of 0.2% oil content. In other words, the productivity of a given sweating installation is almost doubled where the final oil content is 0.4% instead of 0.2%. In practice, with the improvements effected by addition of the polymer resin, a satisfactory grade of wax can be produced containing 0.6 or even 0.65% by weight of oil. When oil content of these ranges can be tolerated, the production from a sweater unit can be increased very substantially and in some cases it may be doubled. This results in very substantial economy in processing. A comparison of the physical properties of various portions of a paraffin wax of the general type of Sample A, Table II, having various oil and resin contents is shown in Table VI.

The improvement of tensile strength effected

TABLE VI

| Per Cent S-50 | Per Cent Oil Added (Pure Sweater Oil) [1] | Total Per Cent Oil by Ultraviolet Light Test | M. P. °F. | Tensile lbs./¼ Sq. Inch | ASTM 5-25 Penetration | R. I. at 70° C. | C. S. Viscosity at 210° F. | Degree of Staining [2] | Heat Stab. [3] |
|---|---|---|---|---|---|---|---|---|---|
| 0 | 3 | 0.3 | 133 | 61 | 12 | 1.4330 | 3.60 | 1 1/16" | 1 |
| 0 | 0.2 | 0.5 | 132 | 50 | 13 | Not Det. | Not Det. | 1 13/16" | 1 |
| 0 | 0.4 | 0.7 | 132 | 37 | Not Det. | Not Det. | Not Det. | 1 3/8" | 3 |
| 0.2 | 0 | 0.3 | 132 | 72 | 11 | 1.4316 | 3.90 | 5/8" | 1 |
| 0.4 | 0 | 0.3 | 132 | 73 | 11 | 1.4318 | 4.22 | 1/2" | 1 |
| 0.2 | 0.1 | 0.4 | 132 | 68 | 11 | 1.4317 | 3.19 | 5/8" | 1 |
| 0.4 | 0.1 | 0.4 | 132 | 73 | 11 | 1.4320 | 4.19 | 1/2" | 1 |
| 0.2 | 0.2 | 0.5 | 132.5 | 62 | 11 | 1.4321 | 3.93 | 7/8" | 1 |
| 0.4 | 0.2 | 0.5 | 132.5 | 72 | 11 | 1.4319 | 4.23 | 1/2" | 1 |
| 0.2 | 0.3 | 0.6 | 133 | 49 | 12 | 1.4319 | 3.91 | 5/8" | 1 |
| 0.4 | 0.3 | 0.6 | 132 | 64 | 12 | 1.4318 | 4.22 | 9/16" | 1 |
| 0.2 | 0.4 | 0.7 | 132 | 47 | 12 | 1.4320 | 3.89 | 5/8" | 3 |
| 0.4 | 0.4 | 0.7 | 132 | 53 | 11 | 1.4322 | 4.12 | 7/8" | 2 |

[1] Sweater oil from 140° F. melting point paraffin wax. Melting point of original sweater oil was 97° F. However, in this work the original sweater oil was extracted at −20° F. with methyl ethyl ketone to remove the pure oil fractions from the low melting point wax fractions. After the extraction step, all the M. E. K. was removed from the oil on a hot plate, under slight vacuum. The pure yellow oil was then blended in the several samples. The original 140° M. P. paraffin that was used in the plant to obtain this sweater oil had been given an acid treatment.
[2] Oil Staining test at 50° C. for 24 hrs.
[3] Heat stability test—1=good, 2=fair, 3=poor as evaluated by odor and taste.

by the use of small amounts of resin in waxes of various oil content is shown in Figure I of the drawing. Tensile strength specifications commonly require the reduction of oil content to a low level even where the other characteristics mentioned previously are not required. By the addition of small quantities of polymer, a higher oil content can be tolerated and the cost of the added resin usually is substantially less than the cost of further sweating to a very low oil content, effecting a considerable over-all economy.

It will be understood from the foregoing that the wax compositions of the present invention may contain various other ingredients, such as coloring materials, tackiness agents, and the like, as may be required for specific purposes. Conventional oxidation inhibitors may also be used.

What is claimed is:

The process for producing a wax composition having the properties of wax containing less than 0.3% by weight of oil from wax containing more than 0.3% but less than 0.65% by weight of oil, by incorporating into said wax 0.2 to 0.4% by weight of a styrene isobutylene copolymer of 50 to 60% styrene content at a temperature above the melting point of the paraffin wax with mechanical agitation.

DAVID W. YOUNG.

REFERENCES CITED

The following references are of record in the file of this patent:

"The S-Polymers," Rubber Age article, pages 187–190, November 1947.